United States Patent
Barnett et al.

(10) Patent No.: US 6,217,840 B1
(45) Date of Patent: *Apr. 17, 2001

(54) PRODUCTION OF FUMED SILICA

(75) Inventors: Robert J. Barnett, Goldendale, WA (US); Michael B. Mezner, Sandy, OR (US)

(73) Assignee: Goldendale Aluminum Company, Goldendale, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/374,546

(22) Filed: Aug. 13, 1999

Related U.S. Application Data

(63) Continuation-in-part of application No. 09/298,087, filed on Apr. 22, 1999, which is a continuation-in-part of application No. 09/277,804, filed on Mar. 27, 1999, now Pat. No. 6,123,908, which is a continuation-in-part of application No. 08/977,435, filed on Nov. 24, 1997, now Pat. No. 5,955,042, which is a continuation-in-part of application No. 08/569,271, filed on Dec. 8, 1995, now Pat. No. 5,723,097.

(51) Int. Cl.$^7$ .......................... C01B 33/12; C01B 33/08; C01B 7/19

(52) U.S. Cl. .................. 423/335; 423/336; 423/342; 423/484; 423/132

(58) Field of Search .................. 423/132, 335, 423/336, 337, 340, 342, 483, 484, 551, 625, 626

(56) References Cited

U.S. PATENT DOCUMENTS

| | | |
|---|---|---|
| 38,285 | 4/1863 | Cobley . |
| 2,780,523 | 2/1957 | Gloss ........................................ 23/88 |
| 3,969,485 * | 7/1976 | Flemmert ............................. 423/484 |
| 4,113,831 | 9/1978 | Orth, Jr. et al. ...................... 423/119 |
| 4,113,832 | 9/1978 | Bell et al. ............................. 423/119 |
| 4,158,701 | 6/1979 | Andersen et al. .................... 423/119 |
| 4,160,808 | 7/1979 | Andersen et al. .................... 423/119 |
| 4,308,244 | 12/1981 | Sikdar et al. ......................... 423/339 |
| 4,355,017 * | 10/1982 | Gamson et al. ...................... 423/484 |
| 4,394,365 | 7/1983 | Gnyra .................................. 423/485 |
| 4,508,538 | 4/1985 | Leathers ................................. 23/313 |
| 4,559,218 | 12/1985 | Flemmert ............................. 423/336 |
| 4,572,827 | 2/1986 | Flemmert ............................. 423/336 |
| 4,693,916 | 9/1987 | Nagayama et al. ................ 427/397.7 |
| 4,735,784 | 4/1988 | Davis et al. .......................... 423/111 |
| 4,915,705 | 4/1990 | Mollere et al. ....................... 423/362 |
| 4,927,459 | 5/1990 | Gardner et al. ........................ 75/685 |
| 4,981,664 | 1/1991 | Chieng ................................. 425/339 |
| 5,024,822 | 6/1991 | Hittner ................................. 423/111 |
| 5,164,174 | 11/1992 | Banker et al. ....................... 423/659 |
| 5,165,907 | 11/1992 | Chieng ................................. 423/339 |
| 5,222,448 | 6/1993 | Morgenthaler et al. ............. 110/346 |
| 5,266,289 | 11/1993 | Tsugeno et al. ..................... 423/339 |
| 5,286,274 | 2/1994 | Lindkvist et al. ................... 75/10.48 |
| 5,340,560 | 8/1994 | Rohr et al. ........................... 423/337 |

(List continued on next page.)

Primary Examiner—Steven Bos
(74) Attorney, Agent, or Firm—Andrew Alexander

(57) ABSTRACT

A method for producing fumed silica and a fluorine-containing product from a source of silica in solid form and a solid material containing fluorine, the solid material selected from the group consisting of sodium aluminum tetrafluoride, cryolite, aluminum fluosilicate ammonium bifluoride, sodium aluminum silicofluoride, and sodium fluosilicate. The method comprises the steps of digesting the silica in solid form and the solid material selected from the group consisting of sodium aluminum tetrafluoride, cryolite, aluminum fluosilicate, ammonium bifluoride, sodium aluminum silicofluoride, and sodium flurosilicate in a sulfuric acid digester. The digestion step produces a first gas component comprised of silicon tetrafluoride, hydrogen fluoride and water vapor. The first gas component is removed from the digester. The gas component recovered from the digester is heated to a temperature sufficiently high to convert the silicon tetrafluoride to fumed silica in the presence of the hydrogen fluoride and the finned silica is separated from the hydrogen fluoride.

21 Claims, 2 Drawing Sheets

U.S. PATENT DOCUMENTS

| | | | |
|---|---|---|---|
| 5,458,864 | 10/1995 | Tsugeno et al. | 423/339 |
| 5,470,559 | 11/1995 | Grolman et al. | 423/489 |
| 5,478,546 | 12/1995 | Matsumura et al. | 423/335 |
| 5,558,690 | 9/1996 | Hnat et al. | 65/134.8 |
| 5,558,847 | 9/1996 | Kaaber et al. | 423/111 |
| 5,599,520 | 2/1997 | Garcés et al. | 423/700 |
| 5,679,315 | 10/1997 | Neuman et al. | 423/339 |
| 5,683,663 | 11/1997 | Keller et al. | 423/111 |
| 5,723,097 | 3/1998 | Barnett et al. | 423/111 |
| 5,776,240 | 7/1998 | Deller et al. | 106/482 |
| 5,776,426 | 7/1998 | Kidd et al. | 423/111 |
| 5,846,311 | 12/1998 | Bomal et al. | 106/492 |
| 5,853,685 | 12/1998 | Erickson | 423/335 |

* cited by examiner

PRODUCTION OF FUMED SILICA

CROSS REFERENCE TO RELATED APPLICATIONS

This application is a continuation-in-part of U.S. Ser. No. 09/298,087, filed Apr. 22, 1999, which is a continuation-in-part of U.S. Ser. No. 09/277,804, filed Mar. 27, 1999, now U.S. Pat. No. 6,123,908, which is a continuation-in-part of U.S. Ser. No. 08/977,435, filed Nov. 24, 1997, now U.S. Pat. No. 5,955,042, issued Sep. 21, 1999, which is a continuation-in-part of U.S. Ser. No. 08/569,271, filed Dec. 8, 1995, now U.S. Pat. No. 5,723,097, issued Mar. 3, 1998.

BACKGROUND OF THE INVENTION

This invention relates to fumed silica and more particularly it relates to a method of producing fumed silica and other products.

Fumed silica is used as a thickener or reinforcing agent in inks, resins, rubber, paints and cosmetics, for example. There are many processes in the art which disclose the production of silica, or fumed silica, or which disclose processes for the purification of silica. For example, U.S. Pat. No. 4,559,218 discloses a process and apparatus for preparing finely divided silicon dioxide having high thickening capacity and good thixotropic properties by reaction of silicon fluoride in the vapor phase with water vapor, combustible gas and free oxygen-containing gas in a flame reaction zone to form silicon dioxide and hydrogen fluoride while cooling the gaseous reaction mixture in that portion of the reaction zone adjacent the base of the flame by contact with a cooling surface maintained at a temperature below 500° C. but above the dew point of the reaction waste gases generated in the flame reaction.

U.S. Pat. No. 5,853,685 discloses a process for the production of high purity silica from waste by-product silica and hydrogen fluoride. In this process high purity silica is obtained by the reaction of impure by-product waste silica with hydrogen fluoride preferably in the presence of water or sulfuric acid, producing silicon tetrafluoride gas and a mother liquor. The silicon tetrafluoride is separated from the mother liquor, which retains the impurities originally contained within the impure silica. The silicon tetrafluoride gas is contacted with high-purity water, in a clean environment, to form a slurry of high purity silica and high-purity hydrofluosilicic acid (FSA). A portion of the silica is filtered from the slurry and washed producing a high purity silica product. The rest of the silica-FSA slurry is preferably reacted with ammonia to form a slurry of ammonium fluoride and silica. The silica is separated from the ammonium fluoride and preferably washed and calcined to remove any remaining ammonium fluoride, leaving additional high purity silica product.

U.S. Pat. No. 5,679,315 discloses a method for production of high purity silica and ammonium fluoride from silicon tetrafluoride-containing gas, particularly the gas generated by acidulation. The basic method comprises recovering silicon tetrafluoride-containing gas from the acidulation of a fluorine-containing phosphorus source, separating liquid entrainment from the gas, converting the gas recovered to an ammonium fluosilicate solution, and ammoniating said ammonium fluosilicate solution to produce high purity silica and ammonium fluoride.

U.S. Pat. No. 2,780,523 discloses a process for recovering solid calcium fluoride containing product and colloidal silica solution from a fluosilicic acid solution. This process uses calcium carbonate to react with the fluosilicic acid.

U.S. Pat. No. 4,308,244 discloses a process for producing fluorine compounds and amorphous silica in which hydrofluoric acid and/or other fluorine compounds are recovered by reacting fluosilicic acid with a sodium-containing compound to form an alkaline aqueous slurry comprising precipitated amorphous silica and dissolved sodium fluoride. The precipitated amorphous silica is separated from the alkaline aqueous slurry leaving an aqueous solution of sodium fluoride. The sodium fluoride solution can be used as such or reacted with other substances (such as alumina, to form synthetic cryolite). Sodium fluoride is recovered from the aqueous solution (as by evaporation or extraction) and used per se or reacted with sulfuric acid to produce hydrogen fluoride.

U.S. Pat. No. 4,508,538 discloses a method of recovering fumed hydrophobic $SiO_2$, produced by the flame hydrolysis of a ternary azeotrope of $H_2$ $SiF_6$, HF, and $H_2O$. The method involves passing the fumed hydrophobic silica, as it leaves the combustion chamber, through a nonclassifying agglomerator at a residence (travel) time of from about 0.5 to several seconds, preferably about 1.0 to about 5.0 seconds, then separating the filmed silica from the product stream in a cyclone separator or other means for collecting dispersoids.

U.S. Pat. No. 4,572,827 discloses a process for preparing finely divided silicon dioxide in good yield by reaction of silicon fluoride in the vapor phase with water vapor, combustible gas and free oxygen-containing gas in a flame reaction zone to form hydrogen fluoride and silicon dioxide entrained in a gaseous reaction mixture; withdrawing the gaseous reaction mixture from the flame reaction zone; and then immediately and rapidly cooling the gaseous reaction mixture and entrained silicon dioxide to a temperature below 700° C. by passing the gaseous reaction mixture in a turbulent flow at a Reynolds number above 300 under constraint through a straight narrow passage in alignment with the gas flow, the passage having a diameter within the range from about 20 to about 150 mm and smooth walls constituting a cooling surface.

U.S. Pat. No. 4,915,705 discloses a process for producing high grade silica and fluorine-containing coproducts from fluosilicic acid. To produce silica, the fluosilicic acid is reacted with aqueous ammonia to produce a solid silica product and a solution of ammonium fluoride. The solid silica is washed under controlled conditions and further processed to produce a high grade product. The ammonium fluoride solution is concentrated and sold as a concentrated ammonium fluoride solution product or reacted with metal hydroxides or oxides to produce metal fluorides.

U.S. Pat. Nos. 4,981,664 and 5,165,907 disclose a method for producing high purity silica and ammonium fluoride from silicon tetrafluoride-containing gas wherein silicon tetrafluoride-containing gas from the acidulation of phosphorus-containing rock is recovered and the liquid entrainment is separated from the gas. The recovered gas is converted to an ammonium fluosilicate solution and is ammoniated to produce high purity silica and ammonium fluoride. The recovered gas can be converted to an ammonium fluosilicate solution by absorbing the gas directly in a solution of ammonium fluoride.

U.S. Pat. Nos. 5,266,289 and 5,458,864 disclose a process for producing a high-purity silica, which comprises the steps of reacting a crude silica with ammonium fluoride, acid ammonium fluoride or a mixture thereof in an aqueous medium to produce ammonium silicofluoride, separating the ammonium silicofluoride from an unreacted silica and impurities by the means of a solid/liquid separation, and reacting the thus-obtained ammonium silicofluoride with ammonia in an aqueous medium. This process is a low cost process, and enables to control properties of silica.

U.S. Pat. No. 5,340,560 discloses a method for making fumed silica aggregate having an average convex perimeter in the range of about 0.12 micron to about 0.6 micron based on the combustion of a mixture of a silicon compound, such as an organosilane, an oxygen containing gas, such as air and a fuel such as hydrogen. The fumed silica aggregate has been found to enhance properties in heat curable filled silicone U.S. Pat. No. 5,428,546 discloses a process for preparing powder of silicon compound wherein an alkoxysilane is brought into a hydrolysis-polycondensation reaction using a fluoride salt, e.g., NaF, or a fluorine-containing silicon compound having an Si—F bond in its molecule, e.g., $FSI(OCH_3)_3$, as a catalyst, to produce a powder of a silicon compound such as silica. The process reduces markedly the period of time required for the hydrolysis-polycondensation reaction and yields a porous silicon compound powder with low bulk specific gravity.

In spite of these references, there is still a great need for an economical process for preparing fumed silica and ancillary end products. The present invention provides such a process.

SUMMARY OF THE INVENTION

It is an object of this invention to produce fumed silica by digestion of solid components.

It is another object of this invention to produce fumed silica from solid components.

It is a further object of this invention to provide a process for producing fumed silica and aluminum fluoride.

Still, it is another object of the invention to provide a process for producing fined silica and products such as aluminum fluoride, sodium sulfate, sodium hydroxide, sulfuric acid, sodium aluminate, aluminum fluoride and cryolite by acid digestion of solid components.

These and other objects will become apparent from a reading of the specification and claims appended hereto.

In accordance with these objects, there is provided a method for producing fumed silica and a fluorine-containing product from a source of silica in solid form and a solid material containing fluorine, the solid material selected from the group consisting of sodium aluminum tetrafluoride, cryolite, aluminum fluosilicate, ammonium bifluoride, sodium aluminum silicofluoride, and sodium fluosilicate. Sodium aluminate or alumina trihydrate can be used in conjunction with ammonium bifluoride or sodium fluosilicate ($Na_2SiF_6$) when it is desired to make end products such as aluminum fluoride or cryolite. The method comprises the steps of digesting the silica in solid form and the solid material selected from at least one of the group consisting of sodium aluminum tetrafluoride, cryolite, aluminum fluosilicate, ammonium bifluoride, sodium aluminum silicofluoride, sodium fluosilicate, sodium aluminate alumina trihydrate or mixtures thereof in a sulfuric acid digester. The sodium aluminate and/or alumina trihydrate can be used with ammonium bifluoride or sodium fluosilicate when it is desired to make aluminum compounds in addition to fumed silica. The digestion step produces a gas component comprised of silicon tetrafluoride, hydrogen fluoride and water vapor. The gas component is removed from the digester. The gas component recovered from the digester is heated to a temperature sufficiently high to convert the silicon tetrafluoride to fumed silica in the presence of the hydrogen fluoride and the fumed silica is separated from the hydrogen fluoride.

DETAILED DESCRIPTION OF THE PREFERRED EMBODIMENTS

Figure 1:
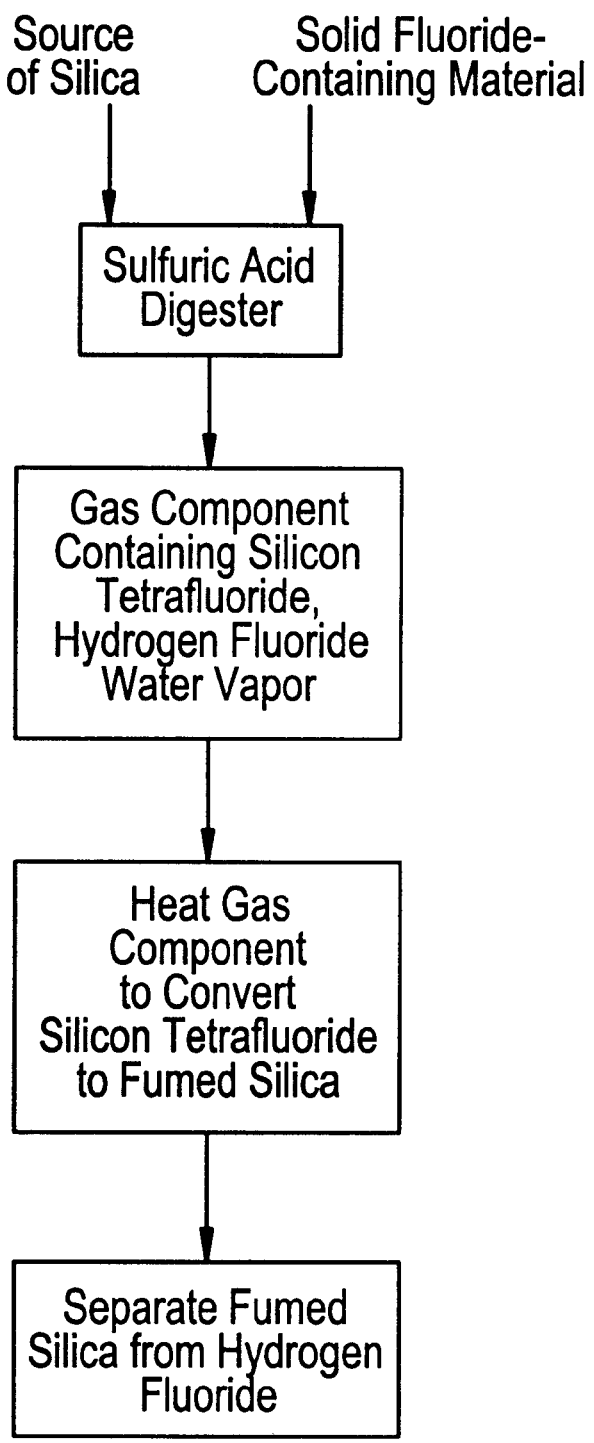
FIG. 1 is a flow diagram showing the steps in the production of fumed silica in accordance with the invention.
Figure 2:
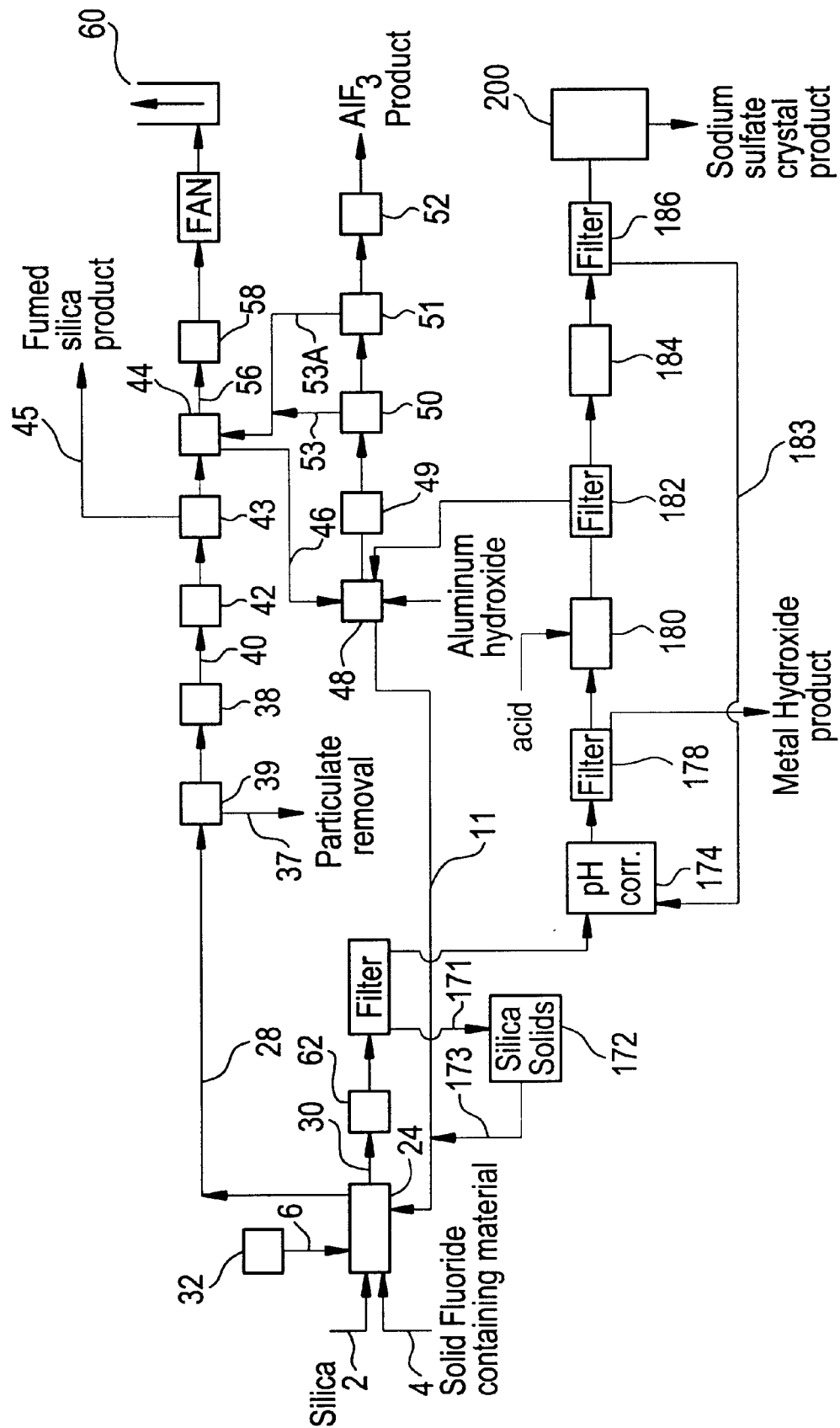
FIG. 2 is a second flow diagram showing more detailed steps in the production of fumed silica and aluminum fluoride.

The process of the present invention for producing fumed silica from solid material is shown in FIGS. 1 and 2. The first part of input or feed material (see FIG. 1) to the process includes a source of silica, such as sand, quartz, flint, diatomite and mineral silicates. If the feed material is not in particulate form, such as sand, it is pulverized to small particle size, e.g., a size in the range of −100 to +200 U.S. sieve series. If necessary, the feed material may be washed with water to remove any extraneous material prior to subsequent digesting.

The second part of the feed material includes a solid fluoride-containing material. The fluoride-containing material may be selected from the group consisting of sodium aluminum tetrafluoride, cryolite, aluminum fluosilicate, ammonium bifluoride, sodium aluminum silicofluoride, and sodium fluosilicate. Sodium aluminate or alumina trihydrate can be used in conjunction with ammonium bifluoride or sodium fluosilicate when it is desired to make end products such as aluminum fluoride or cryolite. As shown in FIG. 1, the first-and-second-materials are fed to an acid digester which is operated to produce a gas component comprising silicon tetrafluoride, hydrogen fluoride and water vapor. The gas component is heated to convert the silicon tetrafluoride to filmed silica and then the fumed silica is separated from the hydrogen fluoride to recover filmed silica and hydrogen fluoride.

FIG. 2 provides detailed steps for the production of filmed silica as well as other products from solid feed materials. In FIG. 2, the source of silica, e.g., sand, is introduced along line 2 to digester 24 and the solid fluoride-containing material is introduced along line 4. Sulfuric acid 32 is introduced along line 6. Other acids which liberate silicon tetrafluoride, hydrogen fluoride and water vapor may be used singly or in combination with sulfuric acid. The first and second feed materials are preferably added utilizing a sealed, variable speed heated screw.

In operation, the ratio of silica to fluoride-containing material in the digester is maintained in the range of about stoichiometric to about 1.5.

In addition it is preferred to use concentrated or strong acid, e.g., sulfuric acid for purposes of digesting the silica and fluoride containing reactants. However, other acids that liberate silicon tetrafluoride and hydrogen fluoride from the solid reactants, e.g., silica and sodium aluminum tetrafluoride, can be used. Typically, the sulfuric acid useful in the digester is approximately 93–98 wt. % sulfuric acid, the remainder water. Further, in the invention, the acid, e.g. sulfuric acid, is maintained in digester 24 in the range of about 0.8 to about 1.2 parts acid to about 0.8 to about 1 part solid-reactants. When sulfuric acid is used, typically digester 24 would contain 15 to 25 wt. % silica (sand), 30 to 35 wt. % sodium aluminum tetrafluoride, 50 to 65 wt. % sulfuric acid, the remainder water.

Typically, the ratio of acid to solid reactants by weight can range from 0.8 to 1.2 sulfuric acid.

Preferably, the digester is maintained at an elevated temperature for purposes of enhancing the reaction. The temperature in the digester can range from ambient up to 300° C. and typically in the range of about 100° to 250° C.

For purposes of reaction of the components in digester 24 to produce silicon tetrafluoride and hydrogen fluoride, the reaction time can range from 30 to 180 minutes, with longer times not known to be detrimental. Thus, the flow of materials through the reactor can be adjusted to provide for this retention time. Shorter times may be used, but usually this requires higher temperatures. Further, it is preferred to operate the digestor under negative pressures for purposes of facilitating removal of the gaseous component.

When silica (sand) and sodium aluminum tetrafluoride are digested in the presence of sulfuric acid, the reaction to liberate silicon tetrafluoride is as follows:

Also, sodium sulfate and aluminum sulfate are produced.

In the digester, the sulfuric acid causes the silica and sodium aluminum tetrafluoride to produce a solid phase containing sodium sulfate and aluminum sulfate and a component or gas phase containing silicon tetrafluoride, hydrogen fluoride and water vapor. That is the fluoride provided by the sodium aluminum tetrafluoride is converted to silicon tetrafluoride and hydrogen fluoride. The gas component can be continuously removed from the digester along line 28.

The gas component removed along line 28 as well as containing silicon tetrafluoride and hydrogen fluoride can contain minor amounts of $SO_2$, $HSO_3$, water vapor and particulate. The gas component can be passed through filter 39 for removal of particulate which is removed along line 37. The particulate removed via line 37 can be returned to digester 24. The gas component transported along line 28 should be heated, e.g., about 180° C., to minimize or prevent condensation on line 28. After filtration, the gas component is heated using thermal oxidizer 38 sufficiently high to convert the silicon tetrafluoride to fumed silica ($SiO_2$). The thermal oxidizer heats the gas component to a temperature in the range of 597° to 1017° C., preferably 750° to 850° C. in the presence of air or water vapor. Preferably, thermal oxidizer 38 is gas fired using natural gas, propane, or a hydrogen-oxygen mixture. Gas stream 40 is then preferably cooled in heat recovery boiler 42, typically to a temperature of about 140° to 200° C. to recover heat for use in other stages of the process.

After cooling, the gases are passed through filter 43 to collect fumed silica produced in oxidizer 38. The fumed silica is removed along line 45 and recovered. The residual gas component remaining after separation from the fumed silica by filter 43 is directed to water scrubber 44. Water scrubber 44 captures hydrogen fluoride and remaining-silicon-tetrafluoride gases as hydrofluoric acid and fluosilic acids. These acids are transferred along line 46 to an alumina trihydrate reaction tank 48 in which aluminum trihydrate is introduced to the fluoride-containing acids. The aluminum trihydrate reacts with the hydrofluoric and fluosilic acids to form soluble aluminum fluoride and precipitate $SiO_2$ particles which are filtered out of the aluminum fluoride solution. The $SiO_2$ particles may be returned along line 11 to be introduced to digester 24.

The aluminum fluoride solution is heated to precipitate aluminum trifluoride trihydrate ($AlF_3 \cdot 3H_2O$) crystals.

Typically, the aluminum fluoride solution is heated to a temperature in the range of about 80° to 250° F. with a typical temperature being about 200° F. for a period of about 3–6 hours. The aluminum trifluoride trihydrate crystals are filtered from solution by filter 49 and directed to dryer 50 where the crystals are heated to reduce the moisture content to preferably less than 10%. The dried crystals are then directed to a calciner or dryer 51 where the crystals or solids are flash heated to a temperature in the range of about 400° to 700° C. to produce an aluminum fluoride product which is removed at 52. The aluminum fluoride thus produced is another end product of the process and may be utilized commercially. For example, the aluminum fluoride may be used as a bath addition for bath ratio corrections in an aluminum electrolytic cell. Further, converting the hydrofluoric and fluosilic acids in this way avoids any environmental problems caused by the fluorides as well as providing a substantial cost savings.

Water vapor from dryer 50 and reaction calciner or dryer 51 is directed back along lines 53 and 53A to water scrubber 44. This eliminates another waste stream in the process. Gases 56 from water scrubber 44, from which hydrofluoric and fluosilic acids have been removed, are passed to caustic scrubber 58 as a polishing step before being released to atmosphere 60. In preferred operation, caustic scrubber 58 utilizes NaOH to reach an alkaline or basic pH preferably in the range of about 6.5 to 8, typically 6.5 to 7.5. In broader aspects, it will be understood that the pH can range from 6.5 to 10. Other alkali or alkaline earth metal hydroxides may be used such as KOH and $Ca(OH)_2$ or combinations thereof. Sodium hydroxide is preferred.

Returning to digester 24, it will be appreciated that there remains in the digester a solid component which is removed along line 30 to a water treatment or water rinse step 62 which dissolves any water soluble salts, e.g., aluminum sulfate and sodium sulfate. The liquid component is separated from the solid component by filter 170. Additional rinses may be added to ensure that all the water soluble sulfates are dissolved. In this aspect of the invention, preferably, the water is heated sufficiently high, e.g., 50° to 100° C., preferably 70° to 100° C. to dissolve soluble sulfates. The solid component is comprised of $SiO_2$ and $CaSO_4$. The silica component rejected by filter 170 is removed along line 171 to provide silica solids 172. The silica solids may be returned to digester 24 along line 173.

The liquid component from filter 170 is removed or pumped to pH correction tank 174. The liquid component from filter 170 is acidic and typically has a pH in the range of about 0.6 to about 1.4. Sodium hydroxide, or other basic material, e.g., KOH or $Ca(OH)_2$, $Na_2CO_3$, is introduced to pH correction tank 174 to increase the pH to a pH in the range of 9 to 14, e.g., greater than 11 and preferably greater than 12.5. In pH correction tank 174, the liquid component is agitated and heated to maintain a temperature preferably in the range of 80° to 95° C. As the pH is increased, the metal salts, e.g., metal sulfates, dissolved in the liquid are converted to metal hydroxides. All metal hydroxides, except sodium hydroxide, as well as sodium aluminate and sodium sulfate precipitate out of solution. The slurry from pH correction tank 174 is transferred to filter 178 to separate the precipitated metal hydroxides from the solution. In filter 178, the metal hydroxide precipitate is removed or separated from the solution. The metal hydroxide precipitate may be treated to recover valuable material therefrom.

The solution from filter 178, as noted, contains dissolved sodium aluminate, sodium hydroxide and sodium sulfate. The solution is transferred to pH adjustment tank 180 in order to precipitate alumina trihydrate. This may be accomplished with the addition of acid. Thus, preferably sulfuric acid is used to lower the pH of solution to a pH in the range of 10 to 12 and preferably in the range of 10.5 to 12. Typically, sulfuric acid having a concentration of about 10 to 25% is used. Upon completion of the precipitation, the alumina trihydrate is separated from the liquid by filter 182. The alumina trihydrate precipitate may be returned along line 136 to alumina trifluoride trihydrate reactor 48 for preparation of aluminum fluoride as described previously.

The liquid remaining after filtration step 182 contains primarily sodium sulfate with only minor or trace amounts of dissolved sodium aluminate. The sodium sulfate containing solution is conveyed to tank 184 where the pH of the solution is lowered from about 10.5 to 11.5 to a pH of about 6 to 8, typically 6.5 to 7.5, to precipitate any remaining alumina trihydrate. The alumina trihydrate is filtered from the sodium sulfate containing solution at filter 186 to remove the precipitated alumina trihydrate. The alumina trihydrate is typically filtered as a gel, removed from the sodium sulfate solution and can be returned to pH correction tank along line 183.

The remaining sodium sulfate solution is transferred to crystallizer 200 where the solution is cooled to a temperature range of about 0° to 10° C. to produce sodium sulfate crystals which are recovered as a useful product. Or, the sodium sulfate solution may be subjected to hydrolysis to recover sulfuric acid and sodium hydroxide.

As can be see from the above, the present invention provides a highly efficient process for not only producing fumed silica but also for providing a process which produces other useful products. Moreover, there are no significant amounts of waste material from the process of the present invention which must be subsequently disposed of in landfills or stored, as previously required in other processes and practices for producing fumed silica. The primary end products of fumed silica, metal hydroxides, sodium sulfate, aluminum fluoride, sulfuric acid and sodium hydroxide are all usable products.

While the invention has been described in terms of preferred embodiments, the claims appended hereto are intended to encompass other embodiments which fall within the spirit of the invention.

What is claimed is:

1. A method of producing fumed silica and a fluorine-containing product from a source of silica and a solid fluoride-containing material selected from the group consisting of sodium aluminum tetrafluoride, cryolite, aluminum fluosilicate, ammonium bifluoride, sodium aluminum silicofluoride, and sodium fluosilicate, the method comprising the steps of:
   (a) digesting said silica and said solid fluoride-containing material selected from the group consisting of sodium aluminum tetrafluoride, cryolite, aluminum flurosilicate, ammonium bifluoride, sodium aluminum silicofluoride, and sodium fluosilicate in a sulfuric acid digester to produce a gas component comprised of silicon tetrafluoride, hydrogen fluoride and water vapor;
   (b) removing said first gas component from said digester;
   (c) heating said gas component recovered from said digester in the presence of an oxygen source to a temperature sufficiently high to convert said silicon tetrafluoride to fumed silica in the presence of said hydrogen fluoride; and
   (d) separating said filmed silica from said hydrogen fluoride.

2. The method in accordance with claim 1 including maintaining silica to fluoride-containing material in a stoichiometric ratio in the range of 1 to 1.5.

3. The method in accordance with claim 1 wherein said digester contains a digest comprised of 15 to 25 wt. % silica; 30 to 35 wt. % sodium aluminum tetrafluoride; 50 to 65 wt. % sulfuric acid, the remainder water.

4. The method in accordance with claim 1 wherein the digester is maintained in a temperature range of ambient to 300° C.

5. The method in accordance with claim 1 wherein the digester is maintained in a temperature range of 100° to 250° C.

6. The method in accordance with claim 1 including digesting said silica and said solid material for a period of 30 to 180 minutes.

7. The method in accordance with claim 1 including the step of maintaining said digester under negative pressures to facilitate removal of said gas component.

8. The method in accordance with claim 1 wherein the solid material is sodium aluminum tetrafluoride.

9. The method in accordance with claim 1 wherein said digesting produces a solid phase containing sulfates.

10. The method in accordance with claim 1 including heating said gas component to a temperature in the range of 597° to 1017° C.

11. The method in accordance with claim 1 including heating said gas component to a temperature in the range of 750° to 850° C.

12. The method in accordance with claim 1 wherein said source of oxygen is selected from one of the group consisting of air, oxygen, and water vapor.

13. The method in accordance with claim 1 including the step of recovering said hydrogen fluoride as hydrofluoric acid.

14. The method in accordance with claim 13 including the step of reacting said hydrofluoric acid with aluminum trihydrate to form aluminum fluoride and recovering said aluminum fluoride.

15. A method of producing fumed silica and a fluorine-containing compound from a source of silica and a solid fluoride-containing material selected from the group consisting of sodium aluminum tetrafluoride, cryolite, aluminum fluosilicate, ammonium bifluoride, sodium aluminum silicofluoride, and sodium fluosilicate, the method comprising the steps of:
   (a) digesting said silica and said solid material selected from the group consisting of sodium aluminum tetrafluoride, cryolite, aluminum fluosilicate, ammonium bifluoride, sodium aluminum silicofluoride, and sodium fluosilicate in a sulfuric acid digester at a temperature range of 100° to 300° C. to produce a gas component comprised of silicon tetrafluoride, hydrogen fluoride and water vapor, said digesting being carried out for 30 to 180 minutes, said digester maintained under negative pressure;
   (b) removing said gas component from said digester;
   (c) heating said gas component recovered from said digester to a temperature in the range of 750° to 850° C. to convert said silicon tetrafluoride to fumed silica in the presence of said hydrogen fluoride; and
   (d) separating said fumed silica from said hydrogen fluoride.

16. A method of producing fumed silica and a fluorine-containing compound from a source of silica and sodium aluminum tetrafluoride, the method comprising the steps of:
   (a) digesting said silica and said solid sodium aluminum tetrafluoride in a sulfuric acid digester to produce a gas component comprised of silicon tetrafluoride, hydrogen fluoride and water vapor;

(b) removing said gas component from said digester;

(c) heating said gas component recovered from said digester in the presence of an oxygen source to a temperature sufficiently high to convert said silicon tetrafluoride to fumed silica in the presence of said hydrogen fluoride; and (d) separating said fumed silica from said hydrogen fluoride.

17. A method of producing fumed silica and a fluorine-containing compound from a source of silica and cryolite, the method comprising the steps of:

(a) digesting said silica and said cryolite in a sulfuric acid digester to produce a gas component comprised of silicon tetrafluoride, hydrogen fluoride and water vapor;

(b) removing said gas component from said digester;

(c) heating said gas component recovered from said digester in the presence of an oxygen source to a temperature sufficiently high to convert said silicon tetrafluoride to fumed silica in the presence of said hydrogen fluoride; and (d) separating said fumed silica from said hydrogen fluoride.

18. A method of producing filmed silica and a fluorine-containing compound from a source of silica and aluminum fluosilicate, the method comprising the steps of:

(a) digesting said silica and said aluminum fluosilicate in a sulfuric acid digester to produce a gas component comprised of silicon tetrafluoride, hydrogen fluoride and water vapor;

(b) removing said gas component from said digester;

(c) heating said gas component recovered from said digester in the presence of an oxygen source to a temperature sufficiently high to convert said silicon tetrafluoride to fumed silica in the presence of said hydrogen fluoride; and (d) separating said fumed silica from said hydrogen fluoride.

19. A method of producing finned silica and a fluorine-containing compound from a source of silica and ammonium bifluoride, the method comprising the steps of:

(a) digesting said silica and said ammonium bifluoride in a sulfuric acid digester to produce a gas component comprised of silicon tetrafluoride, hydrogen fluoride and water vapor;

(b) removing said gas component from said digester;

(c) heating said gas component recovered from said digester in the presence of an oxygen source to a temperature sufficiently high to convert said silicon tetrafluoride to fumed silica in the presence of said hydrogen fluoride; and (d) separating said fumed silica from said hydrogen fluoride.

20. A method of producing fumed silica and a fluorine-containing compound from a source of silica and sodium aluminum silicofluoride, the method comprising the steps of:

(a) digesting said silica and said sodium aluminum silicofluoride in a sulfuric acid digester to produce a gas component comprised of silicon tetrafluoride, hydrogen fluoride and water vapor;

(b) removing said gas component from said digester;

(c) heating said gas component recovered from said digester in the presence of an oxygen source to a temperature sufficiently high to convert said silicon tetrafluoride to fumed silica in the presence of said hydrogen fluoride; and (d) separating said fumed silica from said hydrogen fluoride.

21. A method of producing fumed silica and a fluorine-containing compound from a source of silica and sodium fluosilicate, the method comprising the steps of:

(a) digesting said silica and said sodium fluosilicate in a sulfuric acid digester to produce a gas component comprised of silicon tetrafluoride, hydrogen fluoride and water vapor;

(b) removing said gas component from said digester;

(c) heating said gas component recovered from said digester in the presence of an oxygen source to a temperature sufficiently high to convert said silicon tetrafluoride to fumed silica in the presence of said hydrogen fluoride; and (d) separating said filmed silica from said hydrogen fluoride.

* * * * *